Feb. 9, 1932.   J. A. WINTROATH   1,844,617
VERTICAL LINED SHAFT OILING DEVICE
Filed July 30, 1925

INVENTOR
JOHN A. WINTROATH
BY
ATTORNEY

Patented Feb. 9, 1932

1,844,617

UNITED STATES PATENT OFFICE

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA

VERTICAL LINED SHAFT OILING DEVICE

Application filed July 30, 1925. Serial No. 46,979.

My invention relates to an oiling system for a vertical shaft having a plurality of bearings throughout its length. In this specification I shall describe an embodiment of my invention used in a vertical turbine irrigation pump.

A quite common vertical turbine irrigation pump includes a pump head placed at the surface of the ground; a column pipe which extends from the pump head to the bottom of a well; a pump section situated at the lower end of the column pipe; and a line shaft which extends from the pump head to impellers of the pump section whereby they are rotated. The line shaft is rotatably supported throughout its length by line bearings which are carried by an oil tube, this oil tube surrounding the line shaft and extending from the pump head to the pump section. The line bearings are generally placed about six feet apart. Oil is furnished to the line bearings by a sight feed drip oil cup which is supported by the pump head in communication with the upper end of the oil tube. The lubricating oil drips from the sight feed drip oil cup into the upper end of the oil tube and flows to the lower end thereof. The oil passes through each line bearing in its passage through the oil tube. The oil is fed from the sight feed drip oil cup at a uniform rate and when the pump is in operation lubricates the line bearings fairly well. When the pump is shut down for a period of time, all of the oil in the oil tube travels to the bottom thereof. In many cases line bearings have been burned out when a pump is started after a period of inoperativeness since there is no oil in the oil tube. Since it takes some time for the oil to pass through the oil tube, it does not reach some of the lower line bearings before they become dry.

It is an object of this invention to provide an oil system for a vertical shaft, this system having means for retaining a body of oil at each bearing of the shaft.

It is another object of my invention to secure oil receptacles to a shaft directly below each bearing thereof.

It is a further object of my invention to provide an oiling system of this general character having automatic means for circulating oil from the receptacles through adjacent bearings.

It is also an object of my invention to provide an automatic oil system of this character in which the oil is fed by centrifugal force.

It is an additional object of my invention to provide an oiling system of this character in which the receptacles are kept full by a flow of oil from the upper end of the shaft.

Other objects and advantages of my invention will be made evident hereinafter.

Referring to the drawings in which I illustrate a preferred form of my invention:

Figure 1:
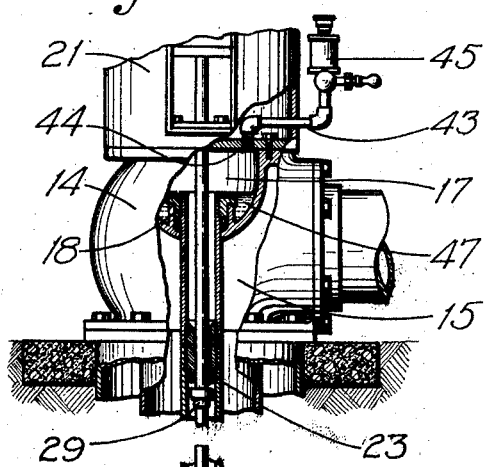
Fig. 1 is a diagrammatic view showing my invention applied to a vertical turbine irrigation pump.

The form of my invention shown in the drawings is adapted for use on a pump as shown in Fig. 1. This pump comprises a pump section 11 attached at the lower end of the column pipe 12 which extends up through a well casing 13. The upper end of the column pipe 12 is secured to a head 14 in communication with a water chamber 15 thereof. Extending from the pump section 11 upwardly through the column pipe 12 is an oil tube 16. The upper end of the oil tube 16 projects into an oil chamber 17 of the head 14 having a stuffing box 18 surrounding the extreme upper end thereof. This stuffing box 18 prevents a leakage from the oil chamber 17 into the water chamber 15 or vice versa. Extending through the oil tube 16 is a line shaft 20. This line shaft 20 extends from impellers (not shown) of the pump section 11 at its lower end and connects to a motor 21 of the head 14 at its upper end.

Figure 2:
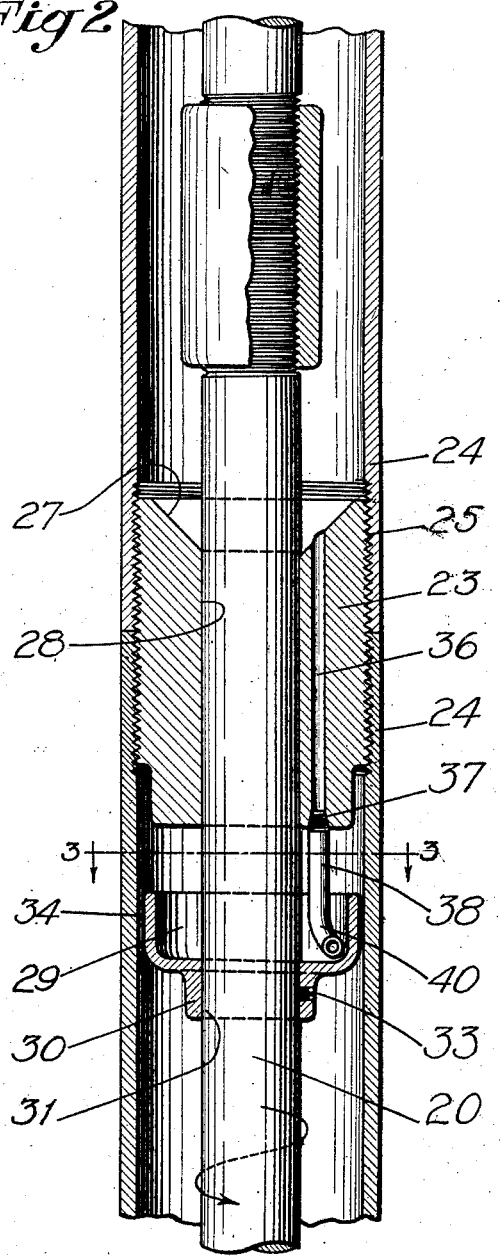
Fig. 2 is an enlarged fragmentary vertical section taken through one of the bearings of a line shaft which bearing has my invention applied thereto.

Bearings 23 are provided throughout the length of the oil tube 16 for rotatably supporting the shaft 20. As clearly shown in Fig. 2, the oil tube 16 is made up of sections 24 which are threadably secured at 25 to the bearings 23. These bearings therefore serve as couplings for the sections 24 of the oil tube 16. The sections 24 are about six feet in length and there is therefore a bearing about every six feet throughout the length of the line shaft 20. The bearings 23 are provided with upper internal conical faces 27 which are lowest at the bearing openings 28.

Figure 3:
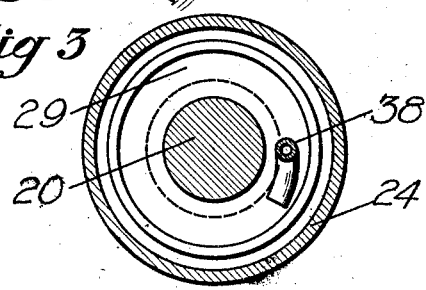
Fig. 3 is a section taken on the line 3—3 of Fig. 2.

Secured directly below the bearings 23 are oil receptacles 29. Hubs 30 of the receptacles 29 have openings 31 through which the shaft 20 extends and are rigidly secured thereto by set screws 33. The largest circumferences 34 of the receptacles 29 are slightly smaller than the inner circumference of the oil tube 16. Extending vertically through the bearings 23 from the conical faces 27 to the lower ends thereof are oil passages 36. Upper ends 37 of oil pipes 38 are threadably secured in the lower ends of the passages 36. The lower ends 40 of the oil pipes 38 are bent outwardly and in a clockwise direction, as shown in Fig. 3, so that they extend to lower and outer parts of the oil receptacles 29.

With reference to Fig. 1 a pipe 43 which is threadably secured at 44 in communication with the oil chamber 17 has a sight feed drip oil cup 45 connected on the outer end thereof. This cup 45 is filled with oil which drips therefrom at a uniform speed. This oil flows through the pipe 43 into the oil chamber 17. A body 47 of oil is formed in the lower part of the oil chamber 17. This body of oil 47 overflows the upper end of the oil tube 16 as oil flows into the chamber 17 from the oil cup 45. The overflowing oil flows through the oil tube 16 and through the bearings 23. The oil passes through the bearing openings 28 of the bearings 23 and drops into the oil receptacles 29. When an upper receptacle 29 fills it overflows and oil will flow to the next oil receptacle 29 and so on until all of the receptacles are full of oil.

When the pump is in operation the shaft 20 is rotated by the motor 21 so as to rotate impellers of the pump 11, thus lifting water up through the column pipe 12 to the surface of the ground. When the shaft 20 rotates, the receptacles 29 rotate therewith and oil is centrifugally thrown to the outer areas thereof, the oil being rotated therewith. The rotation and centrifugal force of the oil causes it to be forced into the lower ends of the oil pipes 38. The oil flows up through these pipes 38 through the passages 36 and onto the upper bevel faces 27 of the bearings 23. The oil flows down these bevel faces 27 and passes to the bearing openings 28, thus lubricating these bearings. The oil flows down and around the shaft and returns to the oil receptacles 29. At each bearing of the entire line shaft 20 there is an individual force feed lubricating system. As this oil is used it is replaced by oil flowing downwardly through the oil tube 16 from the oil chamber 17 of the pump 14. This uniform flow of oil from the upper end of the oil tube maintains the oil receptacles 29 full at all times. When the pump is shut down for a period of inoperativeness all of the oil, as in the common type of pump, does not flow to the bottom of the oil tube, but a body of oil is retained below each bearing 23 by the oil receptacles 29. When the pump is set into operation oil is immediately supplied to the bearings 23 from the receptacles 29 by centrifugal force. This is accomplished in two ways; first, by the oil rising in the oil pipes 38 to the conical faces 27 whence it flows down the shaft, and, second, by the centrifugal force of the oil in the receptacles 29 throwing a portion of this oil over the upper edge of the receptacle whence it drops to the bearing immediately below the oil receptacle. When the pump is shut down the oil at the top of each bearing seeps down into the receptacle below, reaching there either by way of the bearing surface 28 or by the passages 36. Thus the receptacles are always filled with an excess of oil which either spills over the edges or rises through the pipes 38 when the pump is first started. It is not relied upon for the oil to flow from the upper end of the tubing for lubrication at this time.

From the foregoing description it is obvious that the receptacles are kept full of oil at all times by a flow of oil from the upper end of the oil tube and that immediate lubrication will be supplied to the bearings when the pump is started even though it has been shut down for a long period of time. The novel centrifugal feed arrangement of my invention provides a positive supply of oil to the bearings and assures absolutely thorough lubrication. The parts of my invention do not demand any attention after they are once installed due to the fact that they are very simple and require absolutely no adjustment after they have once been set. The installation of an oil system of my invention on a vertically extending shaft, such as shown in the drawings, will positively prevent the burning out of any of the bearings thereof due to lack of lubrication brought on by conditions mentioned in the preamble of this specification.

I claim as my invention:

1. In combination: a vertical shaft; a plurality of bearings rotatably supporting said shaft; oil receptacles carried by said shaft between each of said bearings to centrifugally discharge oil to the adjacent lower bearing; and means at each oil receptacle for supplying oil to the adjacent upper bearing.

2. In combination: a vertical shaft; a plurality of bearings rotatably supporting said shaft; an oil-retaining receptacle below each bearing; and means for supplying oil to each of said receptacles, said receptacles being adapted to centrifugally discharge oil to the lower adjacent bearing immediately when the rotation of said shaft is started.

3. In combination: a vertical shaft; a plurality of bearings rotatably supporting said shaft; an oil-retaining receptacle below each bearing; and means for filling each of said receptacles when the rotation of said shaft is stopped, said receptacles being adapted to centrifugally discharge oil to the lower adjacent bearing immediately when the rotation of said shaft is started.

4. In combination: a shaft; an oil tube surrounding said shaft; bearings journalling said shaft carried by said oil tube, said bearings having upper oil guiding faces; and oil receptacles carried by said shaft below each of said bearings, said oil guiding faces supplying oil to said receptacles through said bearings, and each of said receptacles being in open communication with the oil-guiding face of the bearing immediately therebelow to centrifugally supply oil thereto when said shaft is rotated.

5. In combination: a shaft; an oil tube surrounding said shaft; bearings journalling said shaft carried by said oil tube, each of said bearings having an upper face adapted to guide oil adjacent said shaft; and oil receptacles carried by said shaft below each of said bearings, said oil guiding face draining into the receptacle immediately below, and said receptacles being adapted to centrifugally discharge oil to the upper face of the bearing below.

6. In combination: a vertical shaft; a plurality of vertically spaced bearings journalling said shaft; an oil receptacle mounted on said shaft between each pair of said bearings, each receptacle receiving oil from the bearing immediately thereabove and centrifugally discharging any excess of oil; means for conducting such excess of oil to the bearing immediately therebelow; means for circulating a portion of the oil in each receptacle through the bearing immediately thereabove when said shaft is rotating; and means for supplying oil to the uppermost bearing this new supply of oil dropping successively through said bearings to renew the oil in said receptacles and spilling from said receptacles, and being discharged from the lowermost of said bearings.

In testimony whereof, I have hereunto set my hand at Los Angeles, California, this 24th day of July, 1925.

JOHN A. WINTROATH.